H. C. & C. L. MOORE.
Photographic Camera.
No. 41,634.
Patented Feb. 16, 1864.
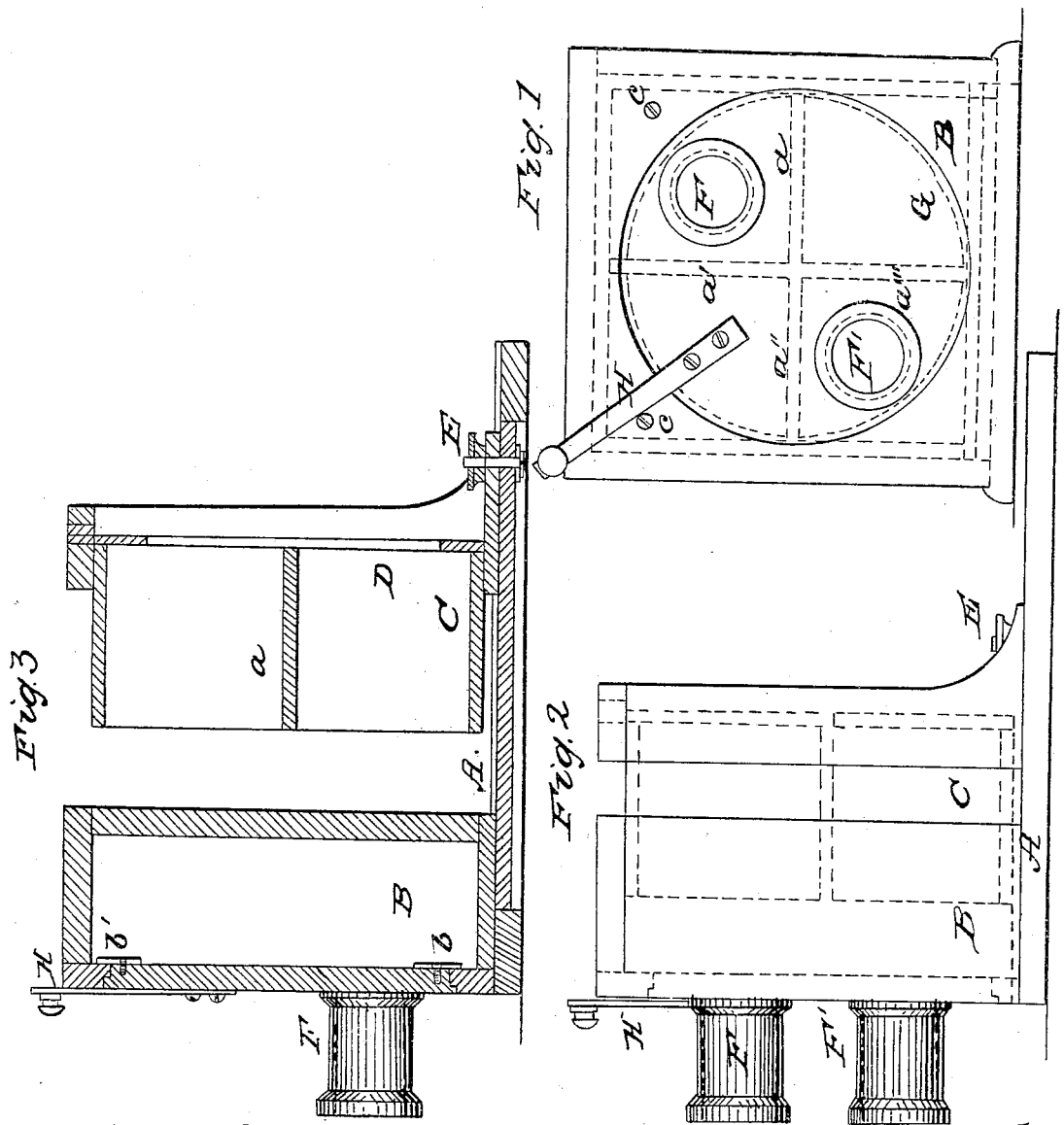
Witnesses
Milton Bradley
Folbert Rast
Inventors
Hiram C. Moore
Chauncey L. Moore

UNITED STATES PATENT OFFICE.

HIRAM C. MOORE AND CHAUNCEY L. MOORE, OF SPRINGFIELD, MASS.

PHOTOGRAPHIC CAMERA.

Specification forming part of Letters Patent No. 41,631, dated February 16, 1864.

*To all whom it may concern:*

Be it known that we, HIRAM C. MOORE and CHAUNCEY L. MOORE, both of the city of Springfield, county of Hampden, and Commonwealth of Massachusetts, have invented certain new and useful Improvements in Photographic Cameras; and we do hereby declare that the following is a full, clear, and exact description of the same, reference being had to the drawings making a part of this specification.

The object of our invention is to facilitate the taking of two or more pictures on one plate of glass, or other suitable substance, when the number of pictures desired on one plate is greater than the number of lenses employed.

Having stated the object of our invention, we will first describe its construction and operation, and then proceed to describe its advantages over other cameras now in use.

In the drawings, Figure 1 is a front view of a double-tube camera; Fig. 2, a side view, and Fig. 3 a longitudinal section of the same.

Like letters indicate corresponding parts in each of the several figures.

A is the bottom of camera; B, the front part of camera-box.

C is a movable part of camera, sliding into B and containing the plate-holder D.

E is a nut and bolt sliding in a slot in A, and serving to hold the part C and plate-holder D in their proper place relative to B.

$a$ $a'$ $a''$ $a'''$ are partitions dividing the box C into four equal parts, and serving to confine the rays of light from each lens to the particular portion of the plate desired, so as to form distinct and separate pictures from each tube.

F F' are two tubes for receiving lenses. These tubes are attached to a circular disk, G, forming a part of the front of the camera-box.

H is a handle by means of which the disk may be rotated. The joint between the disk and camera-box is made in the form of a "rabbet" to exclude the light effectually, and held in place by means of said rabbet combined with ears or pieces of metal, $b$ $b'$.

$c$ $c'$ are two stops to allow the disk to rotate just ninety degrees, and no more. This description represents a double-tube camera, but it will be seen that the invention is as applicable to a single-tube camera.

Cameras have been made for a long time with two tubes, thereby enabling the operator to take two pictures at one and the same time; but it has not been found practicable to increase the tubes beyond that number, while it has been found desirable to take more than two pictures on one plate in order to lessen the expense of printing from the negatives. Therefore the plate-holder or the tubes have been made to slide either vertically or horizontally, the operation being to take two pictures (supposing a double-tube camera to be used) on a portion of the plate at one time, and then by sliding either the plate or tubes bring other portions of the plate into the field of the lenses and take two more.

Now, there are many mechanical difficulties in the construction and operation of the cameras. As the best way of illustrating the advantages gained by the use of our camera, we note some of the defects in those in common use, and above mentioned. Of course, in any camera the joints must be so nicely fitted as to practically exclude the light, and in order to do so the joints must work so closely that they are very liable to stick, as the friction must be overcome directly without the aid of any leverage, and consequently when the operator attempts to move the sliding portion he is very liable to move the camera, and consequently produce great trouble. Then, again, two lenses that will operate in exactly the same time, and with equal sharpness, are considerably difficult to obtain, and therefore many artists have but a singe-tube camera. Now, in order to arrange a single-tube camera to take four pictures on one plate, except in one row, it is necessary to have the tube or plate move in two directions at right angles to each other, which involves considerable mechanism, and that not convenient to operate. Now, in our improved camera we think all these objections are overcome, and the improvement is equally applicable to a single or double tube camera. As here represented applied to a double-tube camera, it is only necessary to rotate the disk ninety degrees, while if only one tube were used it would be necessary to rotate it the whole three hundred and sixty degrees, ninety degrees at a time. As the joint between the disk and box is made to serve as the bearing on which to turn the disk, the whole space back of the disk is clear, with nothing to come in contact with the tubes should they project inside the disk, as they often do through the front of camera-box. Also the handle by which the disk is rotated may be made of any convenient length, so as to give the operator a good leverage in rotating the tubes, thereby avoiding any shaking of the camera. Thus it will be seen that we are enabled to take four pictures on one plate with either a single or double tube camera without any difficulty with sliding mechanism or danger of moving the camera.

The disk G may be made of metal to an advantage.

Now, having fully described the construction and operation of our invention, what we claim as new, and desire to secure by Letters Patent, is—

1. The combination of one or more lens-tubes, F F', and rotary disk G, when applied to, and forming a part of, a camera-box, substantially in the manner and for the purpose herein set forth.

2. The combination of the handle H, stops $c$ $c'$, and disk G, substantially as set forth, whereby the operator has complete control over the movement of the lenses.

3. One or more lens-tubes, F F', rotating about an axis eccentric to the axis or axes of said tubes, in combination with the partitions $a$ $a'$ $a''$ $a'''$, when applied to and forming a part of a photographic camera, for the purpose substantially as herein set forth.

HIRAM C. MOORE.
CHAUNCEY L. MOORE.

Witnesses:
MILTON BRADLEY,
FOLBERT KIRST.